(12) United States Patent
Yang et al.

(10) Patent No.: US 12,313,926 B2
(45) Date of Patent: May 27, 2025

(54) DISPLAY PANEL, METHOD OF MAKING THE SAME, AND DISPLAY DEVICE

(71) Applicant: HKC CORPORATION LIMITED, Shenzhen (CN)

(72) Inventors: Weishi Yang, Shenzhen (CN); Yizhen Xu, Shenzhen (CN); Limiao Wang, Shenzhen (CN); Chunhui Ren, Shenzhen (CN); Rong Tang, Shenzhen (CN); Congcong Zhao, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 246 days.

(21) Appl. No.: 17/982,542

(22) Filed: Nov. 8, 2022

(65) Prior Publication Data
US 2023/0144933 A1    May 11, 2023

(30) Foreign Application Priority Data
Nov. 10, 2021  (CN) .......................... 202111323565.X (51) Int. Cl.
*G02F 1/1333*  (2006.01)
*G02F 1/13*    (2006.01)
*G02F 1/1345*  (2006.01)

(52) U.S. Cl.
CPC ...... *G02F 1/133351* (2013.01); *G02F 1/1316* (2021.01); *G02F 1/133345* (2013.01); *G02F 1/13452* (2013.01)

(58) Field of Classification Search
None
See application file for complete search history.

(56) References Cited

U.S. PATENT DOCUMENTS

2021/0018804 A1*  1/2021  Li ..................... G02F 1/133351

FOREIGN PATENT DOCUMENTS

CN           117202516 A  * 12/2023

* cited by examiner

*Primary Examiner* — Phu Vu (57) ABSTRACT

A display panel, a method of making the same, and a display device are disclosed. The method of making the display panel includes: forming a display motherboard including at least one metal trace, the at least one metal trace being connected to all uncut display panels on the display motherboard; cutting the display motherboard along a cutting line to form at least two display panels, where the at least one metal trace is exposed on at least one side of each of the at least two display panels; dripping a concentrated acid solution to an exposed position of the at least one metal trace to react for a preset time, thus corroding the at least one metal trace at the exposed position thus forming an insulating metal salt structure.

20 Claims, 5 Drawing Sheets

DISPLAY PANEL, METHOD OF MAKING THE SAME, AND DISPLAY DEVICE

CROSS-REFERENCE TO RELATED APPLICATIONS

This application claims the priority and benefit of Chinese patent application CN202111323565X, entitled "Display Panel, Method of Making the Same, and Display Device" and filed Nov. 10, 2021 with China National Intellectual Property Administration, the entire contents of which are incorporated herein by reference.

TECHNICAL FIELD

This application relates to the field of display technology, and more particularly relates to a display panel, a manufacturing method thereof, and a display device.

BACKGROUND

The statements herein are intended for the mere purpose of providing background information related to the present application and do not necessarily constitute prior art.

A liquid crystal display generally includes a liquid crystal display panel, a backlight module, an optical film, a sealant frame, and a conductive tape disposed on the side of the display panel.

Generally speaking, an LCD panel is formed by cutting a display motherboard. Therefore, test traces on the display motherboard are also cut and thus exposed to the air from the sides of the LCD panel. During normal display, since the internal circuit is directly or indirectly connected to the test traces, the exposed test traces are electrically charged, which may contact with an external grounded terminal and cause a short circuit problem, thereby affecting the display effect of the display panel.

SUMMARY

It is therefore a purpose of the present application to provide a display panel, a manufacturing method thereof, and a display device, so as to improve the problem that the exposed metal trace may be short-circuited.

The present application discloses a manufacturing method of a display panel, comprising the operations of:
  forming a display motherboard with at least one metal trace, wherein the at least one metal trace is connected with all uncut display panels on the display motherboard;
  cutting the display motherboard along a cutting line to form at least two display panels, where the metal trace is exposed on at least one side of the display panels;
  dripping concentrated acid solution to the exposed position of the metal trace, and after reacting for a preset time, the metal trace is corroded at the exposed position to form an insulating metal salt structure.

Optionally, prior to the step of cutting the display motherboard along the cutting line to form at least two display panels where the metal trace is exposed on at least one side of the display panels, the manufacturing method further includes:
  forming an insulating layer on the metal trace, etching away the insulating layer corresponding to a window area after patterning the insulating layer, and exposing the metal trace from the window area;

the step of dripping the concentrated acid solution to the exposed position of the metal trace, and after reacting for a preset time, the metal trace is corroded at the exposed position to form an insulating metal salt structure includes:
  dripping the concentrated acid solution into the window area, and reacting for the preset time, so as to form the insulating metal salt structure after corroding the metal trace in the window area;
  where a plurality of window areas are respectively disposed at positions where the cutting line intersects the metal trace.

Optionally, subsequent to the step of dripping the concentrated acid solution to the exposed position of the metal trace, after reacting for a preset time, the metal trace is corroded at the exposed position to form an insulating metal salt structure, the manufacturing method further includes:
  cleaning areas covered by concentrated acid solution with water or an ethanol solution;
  where the concentrated acid solution includes one or both of a concentrated sulfuric acid solution or a concentrated nitric acid solution; the metal trace is a test trace, and the metal trace is formed of a copper material.

Optionally, the step of forming a display motherboard with at least one metal trace, wherein the metal trace is connected to all uncut display panel areas on the display motherboard includes:
  forming an array motherboard with at least one metal trace, the metal trace being connected to all uncut array substrates on the array motherboard;
  forming an insulating layer on the metal trace, forming at least one test terminal on the insulating layer and that is correspondingly electrically connected to the metal trace;
  aligning and bonding the array motherboard with a color filter motherboard to form the display motherboard;

The step of cutting the display motherboard along the cutting line to form at least two display panels, where the metal trace is exposed on at least one side of the display panels includes:
  cutting the color filter motherboard along a first preset cutting line, so that each color filter substrate covers the test terminals;
  cutting the array motherboard along a second preset cutting line so that the bonding region of each array substrate is exposed, so as to cut the display motherboard into at least two display panels;
  where the test terminal is arranged in the non-display area of the display panel, and is not located in the bonding region of the display panel.

Optionally, the step of aligning and bonding the array motherboard with the color filter motherboard to form the display motherboard includes:
  coating a first sealant on the array motherboard along the display area of each array substrate area, and coating a second sealant along the test terminal area;
  aligning and bonding the array motherboard with the color filter motherboard so that the test terminals of each uncut display panel are sealed inside a box of the display panel.

The present application also discloses a display panel, which is formed by using the above-mentioned manufacturing method of the display panel. The display panel includes: a first substrate, at least one metal trace and an insulating layer. The metal trace is arranged on the first substrate. The insulating layer is arranged to cover the metal trace. One end of the metal trace at least extends to the side surface of the first substrate.

The metal trace includes a first segment and a second segment, the material of the first segment of the metal trace is a metal conductive material, and the material of the second segment of the metal trace is an insulating metal salt material. The second segment of the metal trace is exposed on one side of the display panel.

Optionally, the first substrate includes a window area and a non-window area, and the window area is correspondingly arranged at a position where the cutting line of the display panel intersects the metal trace. Other areas on the first substrate than the window area are non-window area.

The insulating layer only covers the metal trace corresponding to the non-window area. The second segment of the metal trace is exposed corresponding to the window area.

Optionally, the metal trace of the second section is cleaned with water or ethanol solution, and there is no metal trace of insulating metal salt material in the window area.

Optionally, the display panel further includes at least one test terminal. The test terminal is correspondingly electrically connected to the metal trace, and the test terminal is arranged in the non-display area of the display panel, and is not located in the bonding region of the display panel. The display panel further includes a second substrate, a first sealant and a second sealant. The first sealant and the second sealant are arranged between the first substrate and the second substrate. The test terminal is located in an orthographic projection area of the second substrate on the first substrate. The first sealant is arranged around the display area, and the second sealant is arranged around the test terminal.

The present application further discloses a display device, including a conductive tape, a circuit board, and the above-mentioned display panel, wherein the conductive tape is disposed corresponding to a side of the display panel, and the circuit board is bound on the display panel.

In the present application, a redox reaction is carried out between the concentrated acid solution and the exposed position of the metal trace to generate a corresponding insulating metal salt structure, that is, the metal trace of the insulating metal salt material, and the insulating metal salt material is generally non-conductive, so that the metal trace is cut off by the insulating metal salt material at the exposed position and no longer conducts electricity. Therefore, the exposed positions of the metal traces are no longer charged, thereby reducing the possibility of short circuit problems caused by contact with an external grounded terminal, thereby improving the display effect of the display panel. It is also worth mentioning that after the display panel is bound, it is often necessary to paste a layer of conductive tape. The conductive tape is used to transfer the static electricity on the display panel to the grounded terminal, but the conductive tape is often in direct contact with the side surface of the display panel, and may be in direct contact with exposed positions of metal traces. In the present application, after the exposed positions of the metal traces are no longer charged, the possibility of a short circuit in subsequent contact with the conductive tape can be greatly avoided.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein. In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "at least one" means two or more. In addition, "above", "on", "under", "below", "inside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application. For those having ordinary skill in the art, the specific meanings of the above terms in this application can be understood depending on specific contexts.

The present application will be described in detail below with reference to the accompanying drawings and optional embodiments.

Embodiment 1

Figure 1:
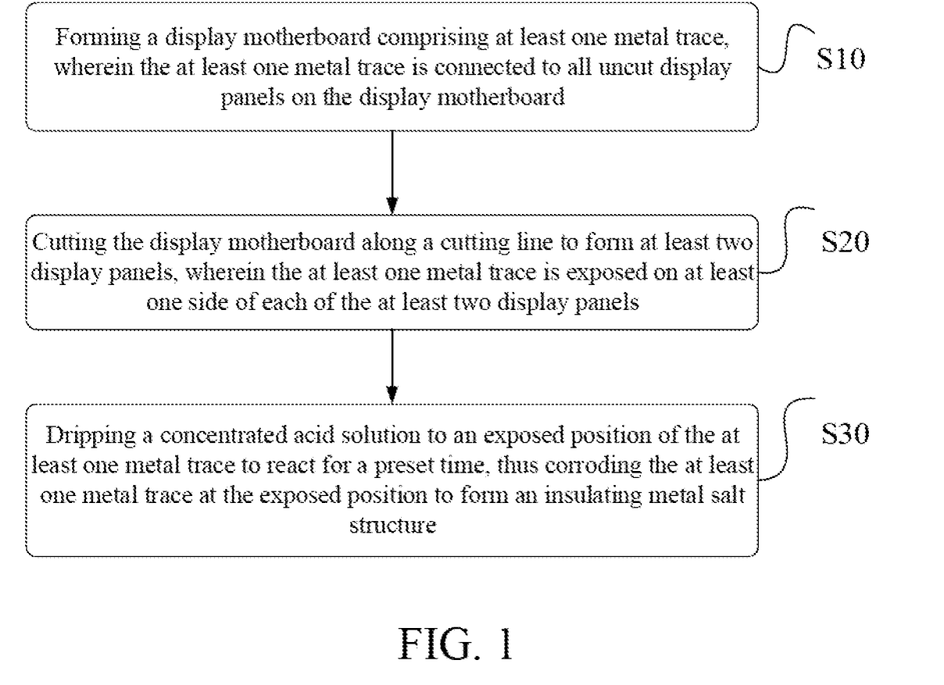
FIG. 1 is a flowchart of a manufacturing method of a display panel according to a first embodiment of the present application.

As shown in FIG. 1, as the first embodiment of the present application, a method for manufacturing a display panel is disclosed, including the steps:

S10: forming a display motherboard with at least one metal trace, wherein the metal trace is connected to all uncut display panels on the display motherboard;

S20: cutting the display motherboard along a cutting line to form at least two display panels, where the metal trace is exposed on at least one side of the display panels;

S30: dripping concentrated acid solution to the exposed position of the metal trace, and after reacting for a preset time, the metal trace is corroded at the exposed position to form an insulating metal salt structure.

In the present application, a redox reaction is carried out between the concentrated acid solution and the exposed position of the metal trace to generate a corresponding insulating metal salt structure, that is, the metal trace of the insulating metal salt material, and the insulating metal salt material is generally non-conductive, so that the metal trace is cut off by the insulating metal salt material at the exposed position and no longer conducts electricity. Therefore, the exposed positions of the metal traces are no longer charged, thereby reducing the possibility of short circuit problems caused by contact with an external grounded terminal, thereby improving the display effect of the display panel. It is also worth mentioning that after the display panel is bound, it is often necessary to paste a layer of conductive tape. The conductive tape is used to transfer the static electricity on the display panel to the grounded terminal, but the conductive tape is often in direct contact with the side surface of the display panel, and may be in direct contact with exposed positions of metal traces. In the present application, after the exposed positions of the metal traces are no longer charged, the possibility of a short circuit in contact with the conductive tape can be greatly avoided.

Specifically, the concentrated acid solution includes one or both of concentrated sulfuric acid solution or concentrated nitric acid solution. The metal traces stated in this application are generally test traces. The metal traces in the following embodiments are all exemplified by test traces, and the metal traces are formed of copper material. Concentrated sulfuric acid solution or concentrated nitric acid solution can be used to react with copper to process metal traces, where the reaction equations:

Cu+2H2SO4(concentrated)=CuSO4+2H2O+SO2;

Cu+4NHO3(concentrated)=Cu(NO3)2+2NO2↑+ 2H2O.

The CuSO4 or Cu(NO3)2 produced after the reaction is a metal salt, and this type of metal salt will not conduct electricity, which can prevent the bad situation caused by the short circuit of the test trace in the later stages. Moreover, the generated metal salt is easily cleaned by water or low-concentration ethanol. Specifically, the manufacturing method may further include the following operation subsequent to the S30 of dripping the concentrated acid solution to the exposed position of the metal trace, and reacting for a preset time to corrode the metal trace at the exposed position thus forming the insulating metal salt structure:

S40: cleaning areas covered by concentrated acid solution with water or an ethanol solution;

Specifically, since the glass substrate is transparent, the lines of the metal traces on the glass substrate are very easy to distinguish. Therefore, the preset time mentioned above can be the preset time during which the concentrated acid solution completely reacts with the metal trace. In the cleaning step, the cleaning can be started after the metal traces in the area covered by the concentrated acid solution are completely reacted, and the cleaning can be performed with water or a low-concentration ethanol solution. One of the purposes is that the water or low-concentration ethanol solution can dilute the unreacted concentrated acid solution and remove it; the other is that the metal salts generated after the above-mentioned reaction are easy to generate blue hydration in water or low-concentration ethanol solution. Therefore, if the glass substrate is not cleaned, blue crystals can be seen on the glass substrate. The gas generated after the reaction is typically treated with an alkaline solution, such as NaOH. After the corresponding exposed area of the metal trace is corroded, a partition will be formed, and there is no metal trace at the position of the partition. It should be noted that other acidic solutions can also be selected in this application, so that the metal traces of non-conductive metal salts are formed after the metal traces react, and the corresponding partitions have metal traces of non-conductive insulating metal salt materials, but this Insulating metal salt materials have the property of being non-conductive.

Figure 2:
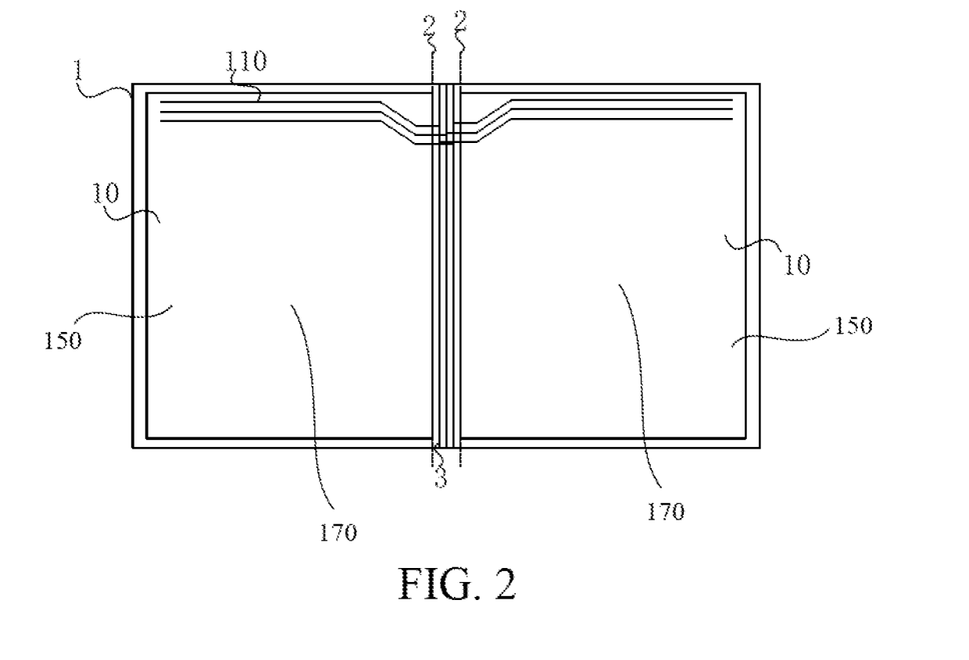
FIG. 2 is a schematic top view of a first type of display motherboard according to the first embodiment of the present application.

As shown in FIG. 2, a schematic structural diagram of a display motherboard is disclosed. In FIG. 2, only an array motherboard and test traces on the array motherboard are illustrated. The display motherboard 1 includes a plurality of uncut display panels 10. The display motherboard 1 is provided with a plurality of cutting lines 2 along the edges of the uncut display panels 10. The display motherboard 1 is provided with a test terminal, and the test traces 110 of each uncut display panel 10 are respectively connected to the test terminal, and the position where the test traces 10 intersect with the cutting lines 2 is exposed after cutting. Specifically, the display motherboard 1 is further provided with a plurality of test common lines 3, and each display panel 10 is respectively provided with a plurality of test traces 110. The corresponding plurality of test traces 110 are respectively connected to the plurality of test common lines 3 in a one-to-one correspondence, and are connected to the test terminal through the test common lines 3. The large display motherboard 1 is also provided with a plurality of cutting lines 2. The display panel 10 can be cut from the large display motherboard 1 by cutting along the plurality of cutting lines 2. Correspondingly, at the position of the cutting lines 2, the test traces 110 on the side of the display panel 10 are exposed.

Figure 3:
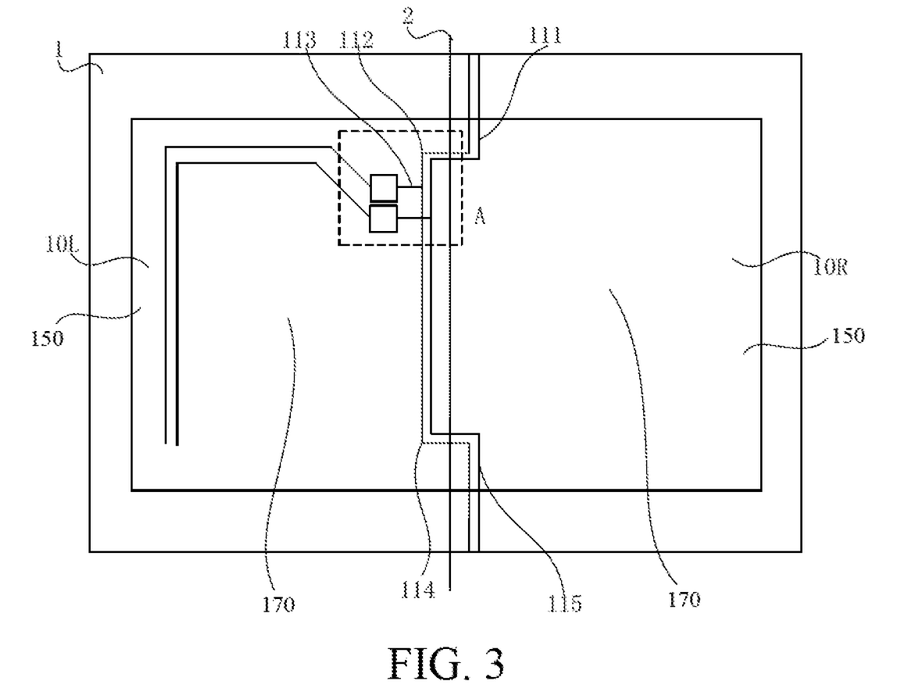
FIG. 3 is a schematic top view of a second type of display motherboard according to the first embodiment of the present application.

As shown in FIG. 3, a schematic structural diagram of another type of display motherboard is shown, and a top-view schematic diagram of a second type of display motherboard is disclosed. The design of the display motherboard 1 is different from that of the first embodiment in that the display motherboard 1 does not include the test common lines 3. That is, there is no position on the large display motherboard 1 for setting the test common lines 3, and all the test traces 110 need to be set on each display panel 10. Moreover, in the display motherboard 1 of this type, only one cutting line 2 is set between two adjacent display panels 10. The test trace 110 includes a test trace segment 111 arranged on the display panel 10R. Then it extends to the test trace segment 112 of the display panel 10L, which is connected to the internal driving circuit of the display panel 10L by the test trace segment 113. Then it extends to the test trace segment 114, before it returns to the test trace segment 115 on the display panel 10R. It is equivalent to connecting the test trace 110 from the display panel 10R in a transitional manner, so that the test traces of each display panel are connected together.

For the above two types of display motherboards, the test traces will be exposed from the side of the display panel. However, the main idea of the present application is to corrode the metal traces in the exposed position by the concentrated acid solution, so that the metal traces in the exposed position no longer have the ability to conduct electricity.

Specifically, the manufacturing method may further include the following step prior to the step 20 of cutting the display motherboard along the cutting line to form at least two display panels, where the metal trace is exposed on at least one side of the display panels:

S11: forming an insulating layer on the metal trace, etching away the insulating layer corresponding to a window area after patterning the insulating layer, and exposing the metal trace from the window area;

where the step S30 of dripping the concentrated acid solution to the exposed position of the metal trace, and after reacting for a preset time, the metal trace is corroded at the exposed position to form an insulating metal salt structure includes:

S31: dripping the concentrated acid solution into the window area, and reacting for the preset time, so as to form the insulating metal salt structure after corroding the metal trace in the window area; where a plurality of window areas are respectively arranged at positions where the cutting line intersects the metal trace.

It should be noted that, although the concentrated acid solution is dripped after the display motherboard is cut in this embodiment, it can also be dripped with concentrated acid in the window area of each display panel area before cutting, followed by cleaning step, this embodiment can save the step of dripping concentrated acid on each display panel once after cutting, which can greatly save process time.

Figure 4:
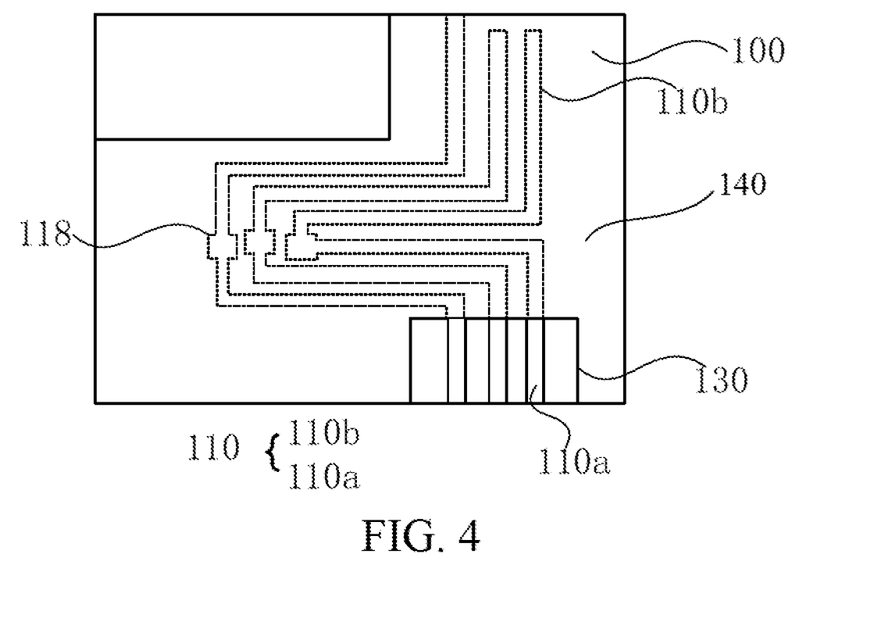
FIG. 4 is an enlarged schematic view of area A shown in FIG. 3 of the first embodiment of the present application.

As shown in FIG. 4, which is a schematic diagram of a cut display panel according to the first embodiment of the present application. FIG. 4 shows an enlarged schematic view of the A area of FIG. 3. The display panel 10 includes: a first substrate, where the first substrate is an array substrate; an array substrate 100; a test trace 110 disposed on the array substrate 100; and an insulating layer 120 covering the test trace 110. The array substrate 100 is divided into a window area 130 and a non-window area 140. The window area 130 is correspondingly disposed at the position where the cutting line of the array substrate 100 intersects the test trace 110. Other areas on the array substrate 100 except the window area are non-window area 140. The insulating layer only covers the metal trace corresponding to the non-window area 140. The metal traces of the second segment are exposed corresponding to the window area. The position of the insulating layer 120 corresponding to the window area 130 is removed by etching, thereby exposing the metal trace 110 of the window area 130. The window area 130 is flush with the side edge (and the cutting line) of the display panel.

Figure 5:
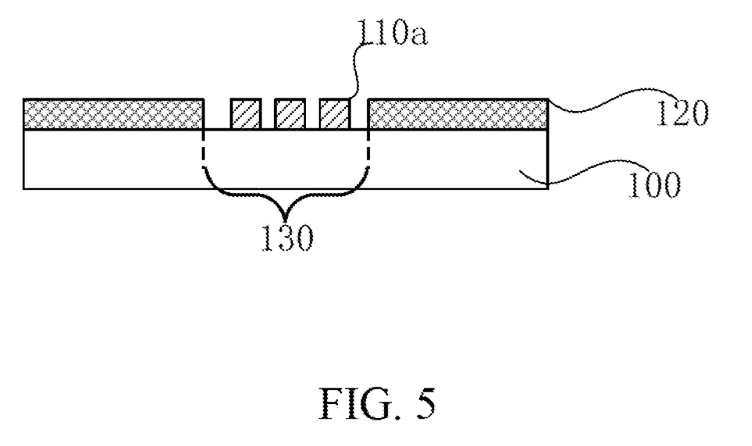
FIG. 5 is a schematic front view of the first type of display panel according to the first embodiment of the present application.

As shown in FIG. 5, a front view of the display panel in FIG. 4 is shown. The window area 130 corresponds to a plurality of exposed test traces 110. The test trace 110 includes a first segment 110a and a second segment 110b. The material of the test trace 110a of the first section is a metal conductive material. The material of the second segment of the metal trace 110b is an insulating metal salt material. The test traces of the second segment are exposed on the side surface of the first substrate and the corresponding window area, respectively.

Figure 6:
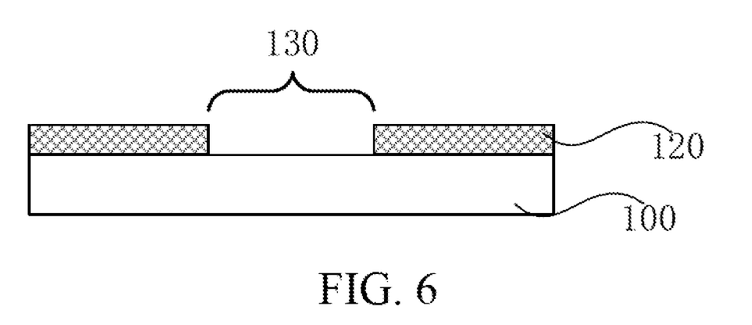
FIG. 6 is a schematic front view of the second type of display panel according to the first embodiment of the present application.

As shown in FIG. 6, a schematic diagram of the display panel in FIG. 5 after the oxidation-reduction reaction of the concentrated acid solution in the above-mentioned manufacturing method of the display panel is shown, where the test traces in the window area 130 are removed. Corresponding metal traces in the window area form a partition. The metal traces of the second segment are cleaned with water or ethanol solution. There is no metal trace of insulating metal salt material in the window area. That is, the window area 130 is correspondingly disposed at the exposed position of the metal trace, and there is no metal trace or a metal trace of a non-conductive insulating metal salt material. In another variant, the test traces in the window area may be set as the first metal layer, and the test traces in other areas may be set as the second metal layer. After sinking the first metal layer in the window area, only the first metal layer in the window area is etched.

Further, in this embodiment, after the step S40 of using water or ethanol solution to clean the area covered by the concentrated acid solution, the manufacturing method further includes:

S41: coating curable glue on the display panel corresponding to the window area to cover the window area.

After the metal traces in the window area are etched, there is no metal layer there. However, there are still exposed metal traces on the side of the window area, which may be oxidized by water vapor in the later stage, causing corrosion. Therefore, in this embodiment, the window area can be sealed by filling the window area with curable glue. The curing adhesive itself needs to be coated on the non-display area 150 corresponding to the array substrate after the display panel is bound. Therefore, this step does not add additional processes and can well protect the metal traces. The curable glue may be UV glue (ultraviolet curable glue).

For the process of dripping and cleaning the concentrated acid solution on the display panel, considering that other exposed metal lines on the display panel, such as test terminals, are likely to be affected, correspondingly, in this embodiment, the step S10 of forming a display motherboard with at least one metal trace, wherein the metal trace is connected to all uncut display panels on the display motherboard includes:

S101: forming an array motherboard with at least one metal trace, the metal trace being connected to all uncut array substrates on the array motherboard;

S102: forming an insulating layer on the metal trace, forming at least one test terminal on the insulating layer and that is correspondingly electrically connected to the metal trace;

S103: aligning and bonding the array motherboard with a color filter motherboard to form the display motherboard;

the step S20 of cutting the display motherboard along the cutting line to form at least two display panels, where the metal trace is exposed on at least one side of the display panels includes:

S201: cutting the color filter motherboard along a first preset cutting line, so that each color filter substrate covers the test terminals; where the test terminal is arranged in the non-display area 150 of the display panel, and is not located in the bonding region 160 of the display panel.

S202: cutting the array motherboard along a second preset cutting line so that the bonding region 160 of each array substrate is exposed, so as to cut the display motherboard into at least two display panels;

The test terminals are formed in the box of the color filter substrate and the array substrate, and the box formed of the color filter substrate and the array substrate are generally sealed by a sealant. Therefore, arranging the exposed test terminals in the box of the display panel can prevent other areas on the panel from being affected when the test trace is etched. Of course, the reason why the test terminal is sealed in this application is that the test terminal is directly connected to the test wire, and generally speaking, the internal design area of the display panel is limited, and the exposed position of the test terminal and the test wire is generally close. Therefore, when the test wire is processed, it is easy to affect the test terminal, so the solution of this embodiment can improve this point very well. It is worth mentioning that in addition to the exposed test terminals in the non-display area 150 of the display panel, there are for example also exposed binding pins in the bonding region 160, and the bonding pins are generally made of metal. Of course, the bonding pins can be protected by covering the bonding pins with the color filter substrate.

Specifically, the step S103 of aligning and bonding the array motherboard with the color filter motherboard to form the display motherboard includes:

S103a: coating a first sealant on the array motherboard along the display area 170 of each array substrate area, and coating a second sealant along the test terminal area;

S103b: aligning and bonding the array motherboard with the color filter motherboard so that the test terminals of each uncut display panel are sealed inside a box of the display panel.

Both the first sealant and the second sealant are used to seal the display panel. The first sealant combined with the array substrate and the color filter substrate seals the liquid crystal cell, and the second sealant combined with the array substrate and the color filter substrate seal is not connected to the liquid crystal cell. The second sealant of the test terminal can be removed or partially removed after the concentrated acid solution is etched and after the cleaning step, so that the probe can be inserted into the test terminal for testing.

It should be noted that the array motherboard and color filter motherboard stated here are large boards. The usual process is to form the thin film transistor array and other film layers on the array motherboard first, form the color resist layer on the color filter motherboard, and then aligning and bonding them to form a cell. After the cell is formed, the array motherboard is cut along the cutting line, and the color filter motherboard is cut along the cutting line. The array motherboard and the color filter motherboard can be cut into different shapes, which are mainly realized by programming the machine in the cutting process. Then the color filter substrate of the present application can be cut into a special-shaped color filter substrate.

Figure 7:
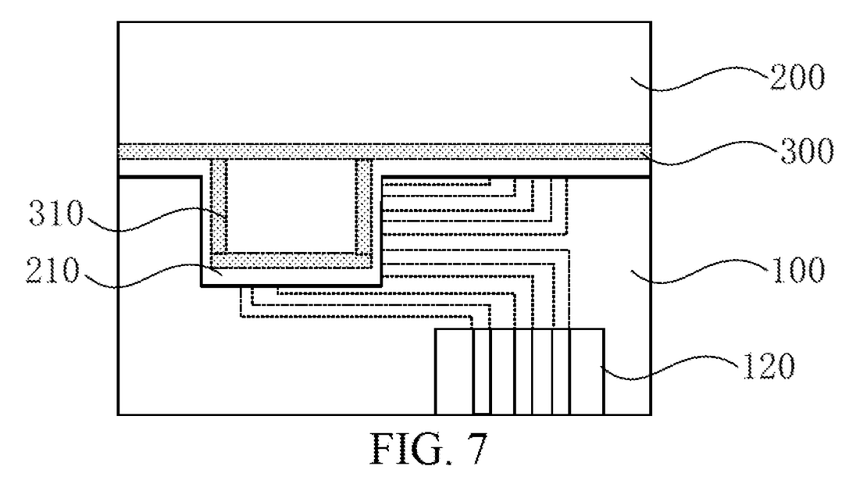
FIG. 7 is a schematic diagram of a color filter substrate of a display panel according to the first embodiment of the present application.

In connection with FIGS. 3-7, the display panel further includes at least one test terminal 118. The test terminal 118 is correspondingly electrically connected to the metal trace 110, and the test terminal 118 is arranged in the non-display area 150 of the display panel, and is not located in the bonding region 160 of the display panel. The display panel further includes a second substrate, a first sealant 300 and a second sealant 310. The second substrate is the color filter substrate 200. The first sealant 300 and the second sealant 310 are disposed between the color filter substrate 200 and the array substrate 100. The test terminal is located in the orthographic projection area of the color filter substrate 200 on the array substrate 100. The first sealant 310 is disposed around the display area 170, and the second sealant is disposed around the test terminal. In a variant embodiment, as shown in FIG. 7, a schematic diagram of a color filter substrate is shown. The color filter substrate 200 includes a protruding portion 210, the protruding portion covers the test terminal, and a second frame is disposed along the protruding portion 210. The second sealant 310 and the first sealant 300 form a sealing cavity for sealing the test terminal 118.

Embodiment 2

Figure 8:
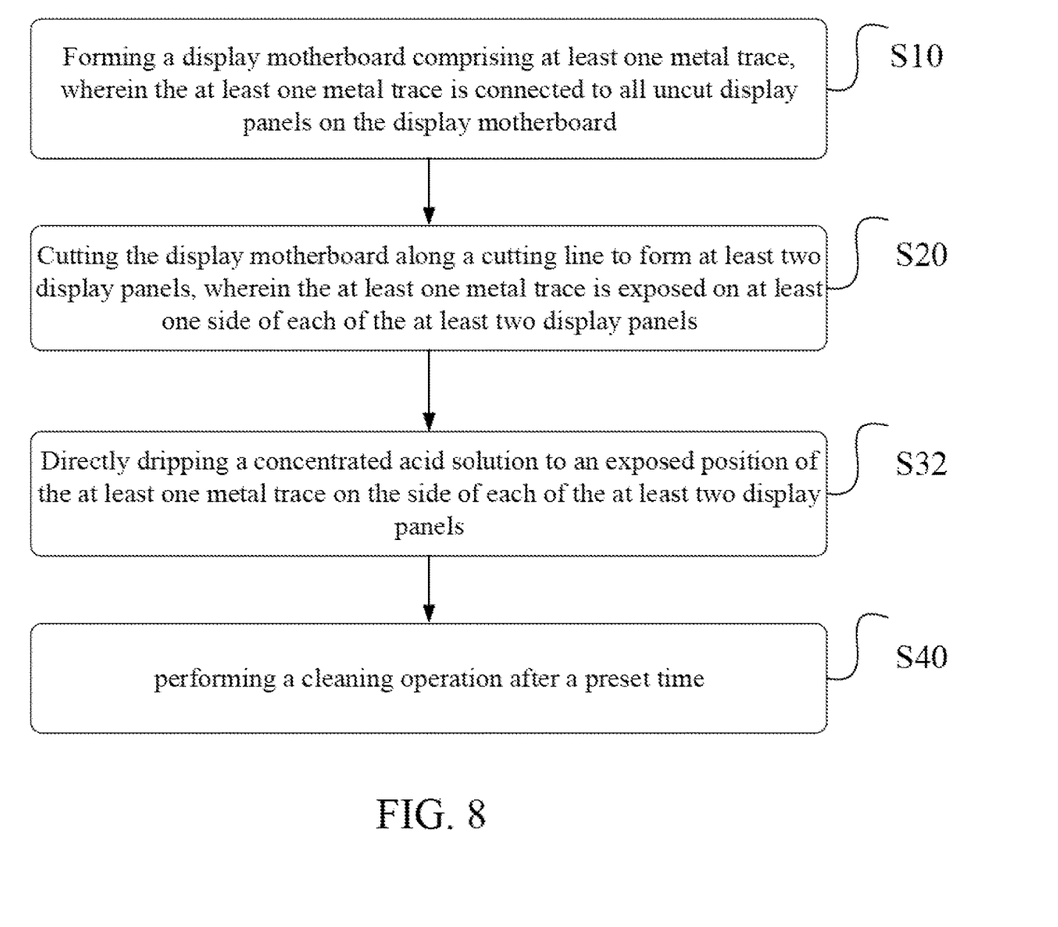
FIG. 8 is a flowchart of a manufacturing method of a display panel according to a second embodiment of the present application.

Specifically, there are various options for the location of corrosion. As shown in FIG. 8, as the second embodiment of the present application, another method for manufacturing a display panel is disclosed, including the steps:

S10: forming a display motherboard with at least one metal trace, wherein the metal trace is connected to all uncut display panels on the display motherboard;

S20: cutting the display motherboard along a cutting line to form at least two display panels, where the metal trace is exposed on at least one side of the display panels;

S32: directly dripping the concentrated acid solution into the exposed area of the side of the display panel corresponding to the metal trace;

S40: performing a cleaning operation after a preset time.

Corresponding to this embodiment, a display panel is disclosed, the display panel includes: a first substrate, at least one metal trace and an insulating layer, where the metal trace is arranged on the first substrate. The insulating layer covers the metal trace. One end of the metal trace extends to at least the side surface of the first substrate. The metal trace includes a first segment and a second segment, the material of the first segment of the metal trace is a metal conductive material, and the material of the second segment of the metal trace is an insulating metal salt material. The second segment of the metal trace is exposed on one side of the display panel.

In this embodiment, no window area is formed, and the exposed metal traces can be corroded directly on the side of the display panel. This embodiment can save the patterning step of the insulating layer, and in actual operation, the side of the display panel can also be directly placed in the concentrated acid solution for reaction, which can reduce the process steps and greatly improve the efficiency. It should be noted that this embodiment does not repeat many detailed features set forth in the previous embodiment. In the above-mentioned first embodiment, the contents applicable to the second embodiment can be combined with the solution of the second embodiment, and the effect will exceed the effect of the second embodiment.

Embodiment 3

Figure 9:
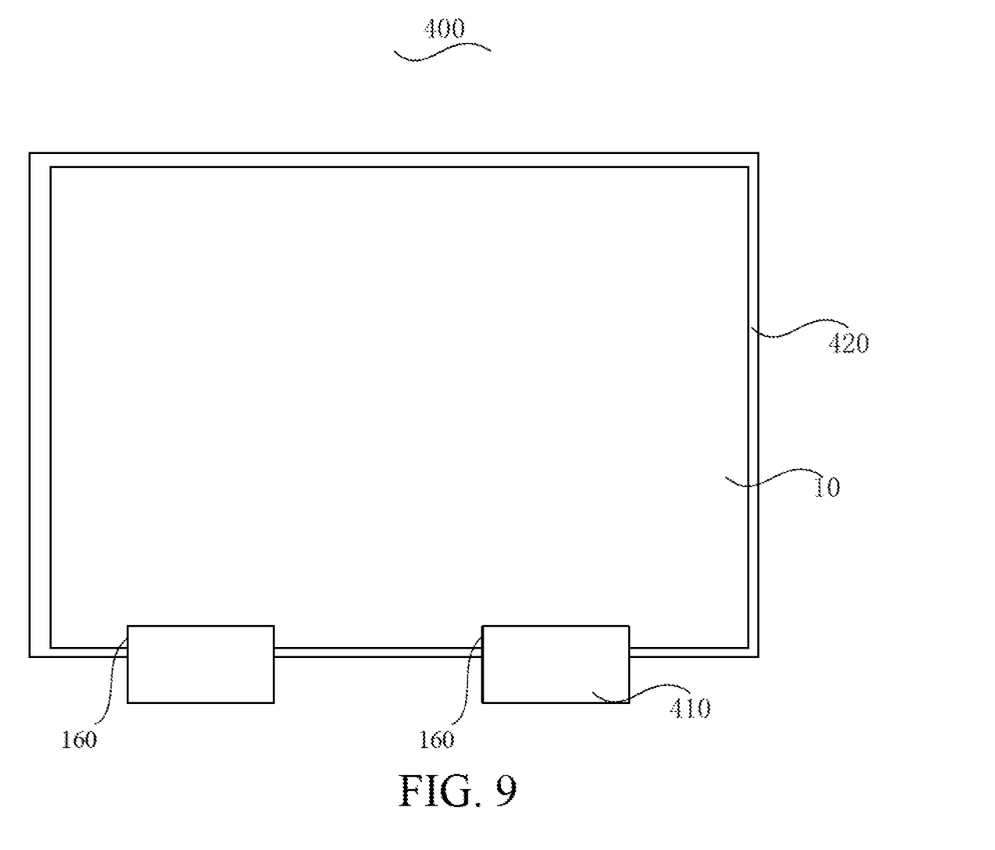
FIG. 9 is a schematic diagram of a display device according to a third embodiment of the present application.

As shown in FIG. 9, as a third embodiment of the present application, the present application further discloses a display device. The display device 400 includes a conductive tape 420, a circuit board 410 and the above-mentioned display panel 10. The conductive tape 420 is disposed to correspond to the side of the display panel 10, and the circuit board 410 is bound on the display panel. The conductive tape in this embodiment can be directly attached to the side of the display panel, and the exposed position of the corresponding metal trace can be directly contacted with the metal trace, and a short circuit will not occur.

It should be noted that the description of various steps involved in this solution are not to be construed as limiting the order of steps, if the implementation of the specific solution is not affected. That is, the steps written in earlier can be performed before, or after, or even at the same time as those written later. As long as this solution can be implemented, any order of the steps should be regarded as falling in the scope of protection of this application.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels, which are all applicable to the above solution.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A method of manufacturing a display panel, comprising:
    forming a display motherboard comprising at least one metal trace, wherein the at least one metal trace is connected to all uncut display panels on the display motherboard;
    cutting the display motherboard along a cutting line to form at least two display panels, wherein the at least one metal trace is exposed on at least one side of each of the at least two display panels;
    dripping a concentrated acid solution to an exposed position of the at least one metal trace to react for a preset time, thus corroding the at least one metal trace at the exposed position to form an insulating metal salt structure.

2. The method of claim 1, further comprising the following operations prior to the operation of cutting the display motherboard along the cutting line to form at least two display panels wherein the at least one metal trace is exposed on at least one side of each of the at least two display panels:
    forming an insulating layer on the at least one metal trace, etching away a portion of the insulating layer corresponding to a window area after patterning the insulating layer, and exposing the at least one metal trace from the window area;
    wherein the operation of dripping the concentrated acid solution to the exposed position of the at least one metal trace to react for a preset time thus corroding the at least one metal trace at the exposed position to form an insulating metal salt structure comprises:
    dripping the concentrated acid solution into the window area to react for the preset time, thus corroding the portion of the at least one metal trace located in the window area thus forming the insulating metal salt structure;
    wherein a plurality of window areas are disposed at respective positions where the cutting line intersects the at least one metal trace.

3. The method of claim 1, further comprising the following operations subsequent to the operation of dripping the concentrated acid solution to the exposed position of the at least one metal trace to react for the preset time thus corroding the at least one metal trace at the exposed position to form the insulating metal salt structure:
    cleaning areas covered by the concentrated acid solution with water or an ethanol solution;
    wherein the concentrated acid solution comprises one or both of a concentrated sulfuric acid solution or a concentrated nitric acid solution; wherein the at least one metal trace is a test trace and is formed of a copper material.

4. The method of claim 3, further comprising the following operation subsequent to the operation of clean the areas covered by the concentrated acid solution with water or the ethanol solution:
    coating a curable glue on the display panel corresponding to the window area to cover the window area.

5. The method of claim 1, wherein the operation of forming the display motherboard comprising at least one metal trace wherein the at least one metal trace is connected to all uncut display panels on the display motherboard comprises:
    forming an array motherboard with at least one metal trace, the at least one metal trace being connected to all uncut array substrates on the array motherboard;
    forming an insulating layer on the at least one metal trace, forming at least one test terminal on the insulating layer, the at least one test terminal being electrically connected to the at least one metal trace;
    aligning and bonding the array motherboard with a color filter motherboard to obtain the display motherboard;
    wherein the operation of cutting the display motherboard along the cutting line to form at least two display panels wherein the at least one metal trace is exposed on at least one side of each of the at least two display panels comprises:
    cutting the color filter motherboard along a first preset cutting line, so that each color filter substrate covers the at least one test terminal;
    cutting the array motherboard along a second preset cutting line so that a bonding region of each array substrate is exposed, thus cutting the display motherboard into at least two display panels;
    wherein the at least one test terminal is arranged in a non-display area of the display panel and is not disposed in the bonding region of the display panel.

6. The method of claim 5, wherein the operation of aligning and bonding the array motherboard with the color filter motherboard to obtain the display motherboard comprises:
    coating a first sealant on the array motherboard surrounding a display area of each array substrate area, and coating a second sealant surrounding the at least one test terminal;
    aligning and bonding the array motherboard with the color filter motherboard so that the at least one test terminal of each uncut display panel is sealed inside a box of the display panel.

7. A display panel, comprising a first substrate, at least one metal trace, and an insulating layer; wherein the at least one metal trace is arranged on the first substrate, the insulating layer is arranged to cover the at least one metal trace, and wherein one end of the at least one metal trace at least extends to a side surface of the first substrate;
  wherein the at least one metal trace comprises a first segment and a second segment, wherein the first segment of the at least one metal trace is of a metal conductive material, and the second segment of the at least one metal trace is of an insulating metal salt material, and wherein the second segment of the at least one metal trace is exposed on a side of the display panel;
  wherein the display panel is manufactured using the method of claim 1.

8. The display panel of claim 7, wherein the second segment of the at least one metal trace is formed by dripping a concentrated acid solution to an exposed position of the at least one metal trace to react for a preset time thus corroding the at least one metal trace at the exposed position to form the insulating metal salt structure.

9. The display panel of claim 7, wherein the first substrate comprises a window area and a non-window area, wherein the window area is correspondingly arranged at a position where a cutting line of the display panel intersects the at least one metal trace, and wherein other areas on the first substrate than the window area are the non-window area;
  wherein the insulating layer only covers the portion of the at least one metal trace corresponding to the non-window area, and wherein the second segment of the metal trace is exposed from the window area.

10. The display panel of claim 9, wherein a concentrated acid solution is dripped into the window area to react for the preset time, thus corroding the portion of the at least one metal trace located in the window area thus forming the insulating metal salt structure.

11. The display panel of claim 10, wherein the second segment of the at least one metal trace is cleaned with water or an ethanol solution, and wherein there is no metal trace of the insulating metal salt material in the window area.

12. The display panel of claim 7, further comprising at least one test terminal correspondingly electrically connected to the at least one metal trace, and wherein the at least one test terminal is arranged in a non-display area of the display panel and is not located in a bonding region of the display panel;
  wherein the display panel further comprises a second substrate, a first sealant, and a second sealant; wherein the first sealant and the second sealant are arranged between the first substrate and the second substrate, wherein the at least one test terminal is disposed in an orthographic projection area of the second substrate on the first substrate, wherein the first sealant is arranged surrounding a display area of the display panel, and the second sealant is arranged surrounding the at least one test terminal.

13. The display panel of claim 11, wherein a curable glue is coated on the display panel corresponding to the window area to cover the window area.

14. The display panel as recited in claim 13, wherein the curable glue comprises a UV glue.

15. A display device, comprising a conductive tape, a circuit board, and a display panel, wherein the conductive tape is disposed corresponding to a side of the display panel, and the circuit board is bound on the display panel;
  wherein the display panel comprises at least one metal trace, and an insulating layer, wherein the at least one metal trace is arranged on the first substrate, the insulating layer is arranged to cover the at least one metal trace, and wherein one end of the at least one metal trace at least extends to a side surface of the first substrate;
  wherein the at least one metal trace comprises a first segment and a second segment, wherein the first segment of the at least one metal trace is of a metal conductive material, and the second segment of the at least one metal trace is of an insulating metal salt material, and wherein the second segment of the at least one metal trace is exposed on a side of the display panel;
  wherein the display panel is manufactured using the method as recited in claim 1.

16. The display device of claim 15, wherein the first substrate comprises a window area and a non-window area, wherein the window area is correspondingly arranged at a position where a cutting line of the display panel intersects the at least one metal trace, and wherein other areas on the first substrate than the window area are the non-window area;
  wherein the insulating layer only covers the portion of the at least one metal trace corresponding to the non-window area; and wherein the second segment of the at least one metal trace is exposed corresponding to the window area.

17. The display device of claim 16, wherein the second segment of the at least one metal trace is cleaned with water or an ethanol solution, and wherein there is no metal trace of the insulating metal salt material in the window area.

18. The display device of claim 15, further comprising at least one test terminal correspondingly electrically connected to the at least one metal trace, and wherein the at least one test terminal is arranged in a non-display area of the display panel and is not located in a bonding region of the display panel;
  wherein the display panel further comprises a second substrate, a first sealant, and a second sealant; wherein the first sealant and the second sealant are arranged between the first substrate and the second substrate, wherein the at least one test terminal is disposed in an orthographic projection area of the second substrate on the first substrate, wherein the first sealant is arranged surrounding a display area of the display panel, and the second sealant is arranged surrounding the at least one test terminal.

19. The display device of claim 17, wherein a curable glue is coated on the display panel corresponding to the window area to cover the window area.

20. The display panel of claim 19, wherein the curable glue comprises a UV glue.

* * * * *